(12) United States Patent
Lefevere et al.

(10) Patent No.: US 12,441,061 B2
(45) Date of Patent: Oct. 14, 2025

(54) METHOD AND SYSTEM FOR MANUFACTURING THREE-DIMENSIONAL POROUS STRUCTURE

(71) Applicant: VITO NV, Mol (BE)

(72) Inventors: Jasper Lefevere, Mol (BE); Bart Michielsen, Mol (BE); Monika Kus, Mol (BE)

(73) Assignee: VITO NV, Mol (BE)

( * ) Notice: Subject to any disclaimer, the term of this patent is extended or adjusted under 35 U.S.C. 154(b) by 611 days.

(21) Appl. No.: 17/569,980

(22) PCT Filed: Jul. 17, 2020

(86) PCT No.: PCT/EP2020/070356
§ 371 (c)(1),
(2) Date: Jan. 6, 2022

(87) PCT Pub. No.: WO2021/013750
PCT Pub. Date: Jan. 28, 2021

(65) Prior Publication Data
US 2023/0347592 A1 Nov. 2, 2023

(30) Foreign Application Priority Data

Jul. 19, 2019 (EP) .................................. 19187363
Jul. 19, 2019 (EP) .................................. 19187398

(51) Int. Cl.
*B29C 64/30* (2017.01)
*B29C 64/118* (2017.01)
(Continued)

(52) U.S. Cl.
CPC ............ *B29C 64/30* (2017.08); *B29C 64/118* (2017.08); *B29C 64/264* (2017.08);
(Continued)

(58) Field of Classification Search
CPC ... B29C 64/106; B29C 64/118; B29C 64/141; B29C 64/165; B29C 64/264;
(Continued)

(56) References Cited

U.S. PATENT DOCUMENTS 7,527,671 B1  5/2009 Stuecker et al.
2014/0021171 A1*  1/2014 Jerby .................... B33Y 10/00
                                                    219/76.1

(Continued)

FOREIGN PATENT DOCUMENTS

CN       109895390 A    6/2019
DE    102017007178 A1   2/2018

(Continued)

OTHER PUBLICATIONS

International Search Report and Written Opinion—PCT/EP2020/070356—mailing date Sep. 29, 2022.

(Continued)

*Primary Examiner* — Jeffrey M Wollschlager
(74) *Attorney, Agent, or Firm* — Banner & Witcoff, Ltd.

(57) ABSTRACT

A method and system for manufacturing three-dimensional porous structures. Filaments are deposited in a predetermined interconnected arrangement in a plurality of stacked layers for forming a porous structure with interconnected pores. Furthermore, the porous structure is subjected to a heat treatment in a heat chamber in order to reduce a moisture, solvent and/or organic material, solvent or organic material content (drying and/or calcination) of the porous structure by irradiating microwave energy through said porous structure. The applied microwave energy is selected based on the structural interconnected arrangement of the deposited filaments defining the shape and size of the pores of the three-dimensional porous structure.

24 Claims, 8 Drawing Sheets

(51) Int. Cl.
*B29C 64/264* (2017.01)
*B29C 64/295* (2017.01)
*B29C 64/393* (2017.01)
*B33Y 10/00* (2015.01)
*B33Y 30/00* (2015.01)
*B33Y 40/20* (2020.01)
*B33Y 50/02* (2015.01)
*B33Y 70/10* (2020.01)

(52) U.S. Cl.
CPC .......... *B29C 64/295* (2017.08); *B29C 64/393* (2017.08); *B33Y 10/00* (2014.12); *B33Y 30/00* (2014.12); *B33Y 40/20* (2020.01); *B33Y 50/02* (2014.12); *B33Y 70/10* (2020.01)

(58) Field of Classification Search
CPC ..... B29C 64/295; B29C 64/30; B29C 64/393; B33Y 10/00; B33Y 30/00; B33Y 40/20; B33Y 50/02; B33Y 70/10; B33Y 80/00
See application file for complete search history.

(56) References Cited

U.S. PATENT DOCUMENTS

| | | | |
|---|---|---|---|
| 2016/0318247 A1* | 11/2016 | Schlachter | B29C 64/106 |
| 2017/0137327 A1* | 5/2017 | Capobianco | C04B 35/486 |
| 2017/0203508 A1* | 7/2017 | Dikovsky | B33Y 10/00 |
| 2017/0232679 A1 | 8/2017 | Gardiner et al. | |
| 2017/0259507 A1 | 9/2017 | Hocker | |
| 2017/0282400 A1* | 10/2017 | Jie | B28B 1/001 |
| 2017/0326816 A1* | 11/2017 | Seepersad | B29C 64/291 |
| 2017/0368758 A1 | 12/2017 | Touma | |
| 2018/0306512 A1* | 10/2018 | Woodard | H05B 6/6402 |
| 2019/0054651 A1* | 2/2019 | Abbott, Jr. | B32B 18/00 |
| 2019/0160704 A1* | 5/2019 | Goodman | B32B 18/00 |
| 2019/0168300 A1 | 6/2019 | Gelbart | |
| 2019/0262903 A1* | 8/2019 | Zambrana | B33Y 40/00 |
| 2020/0047404 A1* | 2/2020 | Plott | B33Y 10/00 |

FOREIGN PATENT DOCUMENTS

| | | | |
|---|---|---|---|
| EP | 2883685 A1 | 6/2015 | |
| EP | 3476898 A1 | 5/2019 | |
| EP | 3486068 A1 | 5/2019 | |
| RU | 2676989 C1 | 1/2019 | |
| WO | 2015147939 A1 | 10/2015 | |
| WO | 2017100783 A1 | 6/2017 | |
| WO | 2017100853 A1 | 6/2017 | |
| WO | 2018081154 A1 | 5/2018 | |
| WO | WO2018183806 | * | 10/2018 |
| WO | 2019023119 A1 | 1/2019 | |
| WO | 2019068685 A1 | 4/2019 | |

OTHER PUBLICATIONS

International Search Report and Written Opinion—PCT/EP2020/070384—mailing date Oct. 12, 2020.
International Search Report and Written Opinion—PCT/EP2020/070354—mailing date Sep. 28, 2020.
International Search Report and Written Opinion—PCT/EP2020/070342—mailing date Oct. 14, 2020.

* cited by examiner

METHOD AND SYSTEM FOR MANUFACTURING THREE-DIMENSIONAL POROUS STRUCTURE

CROSS-REFERENCE TO RELATED APPLICATIONS

This application is a U.S. National Stage application under 35 U.S.C. § 371 of International Application PCT/EP2020/070356 (published as WO 2021/013750 A1), filed Jul. 17, 2020, which claims the benefit of priority to Application EP 19187398.3, filed Jul. 19, 2019, and Application EP 19187363.7, filed Jul. 19, 2019. Benefit of the filing date of these prior applications is hereby claimed. Each of these prior applications is hereby incorporated by reference in its entirety.

FIELD OF THE INVENTION

The invention relates to a method and system for manufacturing three-dimensional (3D) porous structures. The method further relates to a drying and/or calcination unit. Furthermore, the invention relates to a method of drying and/or calcination of a 3D manufactured porous structure. Further, the invention relates to a porous structure obtained by extrusion based additive manufacturing.

BACKGROUND TO THE INVENTION

Additive manufacturing is currently widely used and various techniques exist. It can help building a structure layer-by-layer and the manufactured structure can be employed in various application.

Extrusion-based additive manufacturing methods have been employed for fabrication of porous structures. A material (e.g. paste, polymers, hydrogels, etc.) is extruded through a nozzle in the form of filaments. A certain arrangement of filaments can be obtained by relative movement of the nozzle with respect to a print bed during deposition. During the material extrusion, filaments are extruded from a nozzle and positioned relative to one another according to a predetermined pattern providing the desired properties of the manufactured porous structure. The lay-down pattern is determined by the print path and has major impact on the properties of the printed structure. In this way, complex geometries and porous structures can be obtained with a fully interconnected network of pores which may be required for some applications.

A drying and/or calcination process is often carried out after printing of the porous structures. Often, the drying and/or calcination involves a heat treatment drying and/or calcination of the formed porous structures. In this drying and/or calcination process, the moisture, solvent and/or organic material, solvent and/or organic material content of the porous structures is decreased. Both active and passive drying processes are employed in the art as well as various calcination processes.

Drying and/or calcination processes including a heat treatment step may significantly affect the integrity of the porous structure being dried and this may vary with the technique or process used to effectuate drying and/or calcination. The heat treated dried porous structures may deform or even become damaged as a result. For example, during the drying and/or calcination process cracks or break lines may form in the interconnected porous filament structure. As a result, it may be challenging to produce porous structures with great accuracy and reproducibility using conventional drying and/or calcination processes. Also the mechanical and porous characteristics of the porous structures may be difficult to predict.

RU2676989 discloses a method for the manufacturing of structural elements of complex geometric shapes of a thermoplastic dielectric filament, using FDM of the structural element and a supporting the main object. The thermoplastic material is heated in the print head to a semi-liquid state and extruded as a filament through a nozzle with a small diameter hole. After completion of the formation of the product, the product is placed in the microwave electromagnetic field and exposed to ultrasonic vibration energy, supplied from the side opposite to the input of the microwave energy with the purpose of increasing the density of the material. The frequency of the microwave electromagnetic field applied to the finally formed product is based on the thickness of the formed 3D product. Additionally, also the material density of the printed build material is taken into account for determining the frequency (and thus applied microwave energy) of the microwave electromagnetic field. In a preferred a specific power of 17-18 W/cm$^3$ microwave energy is used. As a result of this treatment, individual particles are fused to agglomerates, porosity is reduced and density is increased. RU2676989 thus seeks to maximize strength of the end product, by maximizing density of the material while subjecting the 3D printed thermoplastic material to heating in selective conditions.

There is a need for improving the drying and/or calcination process of porous structures manufactured by an extrusion based printing process. Furthermore, there is a desire to enhance the printing quality and suitability for printing porous structures for a wider range of applications.

SUMMARY OF THE INVENTION

It is an object of the invention to provide for a method and a system that obviates at least one of the above mentioned drawbacks.

Additionally or alternatively, it is an object of the invention to improve the drying and/or calcination process for extrusion based additive manufactured porous structures.

Additionally or alternatively, it is an object of the invention to improve printability and/or printing quality of porous structures obtained by an extrusion based additive manufacturing process.

Additionally or alternatively, it is an object of the invention to improve the efficiency of an extrusion based additive manufacturing process for fabricating porous structures.

Thereto, the invention provides for a method of manufacturing three-dimensional porous structures, the method including:
  providing a paste composition comprising particles of at least one inorganic material, at least one polymeric binder and at least one solvent,
  depositing filaments of the paste composition in a predetermined interconnected arrangement in a plurality of consecutively stacked layers for forming a three-dimensional porous structure with interconnected pores between the filaments,
  subsequently drying the deposited three-dimensional porous structure by subjecting the porous structure to a heat treatment by irradiating microwave energy through said porous structure, wherein the applied microwave energy employed during the heat treatment is selected based on the structural interconnected arrangement of the filaments defining the shape and size of the pores of the three-dimensional porous structure.

In a preferred embodiment, the filaments are produced from a paste composition which is a viscous paste, in particular a paste comprising particulate material, a viscous binder, which usually will contain some water and/or solvent and/or some organic material.

The microwave drying and/or calcination is employed for removing moisture, solvent and/or organic material from the printed porous structure. The drying and/or calcination process may be intended to cause drying and/or calcination of the printed porous structure with the purpose of drying and/or calcining the filaments to a desired extent, without causing adverse effects on its physical, chemical, geometric or related properties. The drying and/or calcination process may in an alternative embodiment be intended to cause drying and/or calcination of the printed porous structure with the purpose of causing breaking of the filaments at a desired position.

The microwave drying and/or calcination provides advantageous results as the printed structures are obtained by deposition of interconnected filaments of a paste composition at a distance from each other, in a predetermined arrangement in a plurality of consecutive stacked layers. The printed structures are porous with interconnected pores (channels) between the filaments. The microwaves not only can penetrate deeper in the porous structure, they are also capable of penetrating the material of which the filaments are made so that the moisture, solvent and/or organic material, solvent and/or organic material or degradation products thereof can escape through the pores in the filaments and the interconnected pores leading to the outer surface(s) of the porous structure.

The microwave drying and/or calcination of the porous structures offers a high performance drying and/or calcination process with a variety of advantages, including fast drying and/or calcination rates and enhanced product quality for 3D printed porous structures. Fast drying is important as it assists in a better shape retention of the 3D printed structure, in reducing shrinkage and crack formation, and a better preservation of the mechanic strength and mechanic properties. Fast drying may also result in a better preservation of the porosity of the 3D printed structure.

The way the filaments are deposited in the interconnected arrangement in the plurality of stacked layers for forming the porous structure with interconnected pores is coupled to the conditions of the microwave drying and/or calcination. More particularly, the microwave energy applied on the porous structure is coupled to the specific arrangement of the interconnected filaments of the porous structure and to the properties of the filaments in particular their thickness, material composition, porosity, solvent affinity, etc. In this way, a custom microwave drying and/or calcination can be obtained depending on the characteristics of the printed porous structure. Advantageously, in this way, the microwave energy applied for drying and/or calcination is adapted to the porous structure and an improved drying and/or calcination process can be achieved. As a result, also the risk of causing adverse effects during the heat treatment of the drying and/or calcination process can be significantly reduced.

Information about the filaments as such and the deposition of the filaments in the interconnected arrangement is taken into account in the microwave drying and/or calcination process. The applied microwave energy is determined based on the printed porous structure and the material of which the filaments are made and the moisture, solvent and/or organic material content. The filaments may for example contain a moisture expeller, a solvent and/or organic material expeller. In some examples, the filaments are made of a viscous paste.

A build material (e.g. paste, suspension, etc.) can be extruded through a nozzle for three-dimensional filament deposition. The deposited filaments can form a layered network. The layers may for instance be successively printed on top of each other, resulting in a structure formed by a stack of successive layers. The filaments are spaced apart with respect to each other in order to define channels therebetween. A porous structure with pores can thus be obtained in this way. The applied microwave energy can be chosen based on the pattern in which the build material is extruded. This pattern can define the porosity and/or density of the porous structure, which may require different microwave drying and/or calcination parameters.

Different types of porous structures can be obtained which may act differently to the applied microwave energy. Such structure may represent a mesh, a lattice structure, a filament network, a scaffold, a filament framework, filament patterned arrangement or the like. Many types of arrangements and structures are possible. The specific arrangement of the filaments defining the structure of the porous structure may be selected based on the application. This specific arrangement is also taken into account during the microwave drying and/or calcination process, by adapting the applied microwave energy on the basis of said specific arrangement.

The layerwise deposition of the filaments may include extruding a material through a deposition nozzle to form the filaments while moving the deposition nozzle relative to the print bed. The nozzle can be moved with respect to the print bed, and/or vice versa. Hence, kinematic inversions are also envisaged. The way the nozzle has deposited the filaments of build material for forming the porous structure can establish the parameters used for microwave drying and/or calcination.

A uniform heating of the porous material can be obtained by means of the microwave drying and/or calcination process, wherein the applied microwave energy is chosen on the basis of the nature of the printed structure. The nature of the porous structure being printed is thus coupled to the microwave drying and/or calcination conditions. The microwave drying and/or calcination may be carried out uniformly by providing a uniform microwave irradiation of the porous structure. With uniform is meant that the microwave energy to which the porous structure is subjected is uniform over the volume of the porous structure, or that the microwave energy is kept constant with time. Shrinkage of the porous structure during drying and/or calcination can be strongly reduced or avoided by employing the microwave drying and/or calcination on the porous structure.

When the porous structure is exposed to microwave energy, the molecules susceptible to excitation by microwave energy present in the printed material, which are dipoles, begin to spin or vibrate at the same frequency as the electromagnetic field. This spinning or vibration is not limited to an external part or external layers of the porous structure and the filaments composing the structure, but extends into the interior of the structure and into the interior of the material of the filaments. The microwave frequency agitation of molecules in the filaments (e.g. water, solvent and/or organic material) contributes in the generation of heat within the material and eventually leads to moisture, solvent and/or organic material evaporation and/or degradation.

The microwave induced heat depends on the electric field intensity of the microwave energy. When microwave energy penetrates the material of the porous structure, the wave strength can fade away because the microwave energy is absorbed by the material and converted into heat. Advantageously, porous structures may enable a larger penetration depth than solid structures and a release of solvent or moisture from parts of the 3D printed structure located at larger depth in the material of the 3D printed structure. The penetration depth also depends on material properties of the porous structure.

Optionally, the applied microwave energy is selected based on at least the relative spatial positioning and orientation of the filaments forming the three-dimension porous structure.

Optionally, the applied microwave energy is selected based on macro-porosity of the porous structure resulting from the pores formed between the filaments during the printing process, i.e. during dispensing or deposition of the filaments.

Optionally, the applied microwave energy is selected based on at least one of: a filament-to-filament distance, filament lay down pattern, a filament placement interrelation, a geometrical pattern formed by the filaments, or a lay down angle of the filaments in the consecutively stacked layers.

Optionally, the porous structure is stabilized against vibrations in the course of applying the microwave energy.

Optionally, the applied microwave energy is selected based on at least one of: an intra filament porosity (i.e. a (macro-)porosity of the three-dimensional porous structure), or a filament porosity.

Optionally, selecting the microwave energy is selectively effected via a controller unit. The controller may receive information with regard to or indicative of the specific arrangement of the interconnected filaments of the manufactured porous structure. The controller may for instance be linked to an additive manufacturing system. Based on said printing information, the applied microwave energy can be selected by the controller.

Optionally, the heat treatment is carried out in a heat chamber in order to reduce the amount of microwave removable content contained in the paste composition, in particular moisture, solvent and/or organic material.

Optionally, the paste composition comprises one or more inorganic compounds, one or more polymers or a mixture thereof, preferably a viscous paste comprising inorganic compounds.

Optionally, the applied microwave energy is selected based on the density of the porous structure.

The porous structure includes interconnected pores which makes them very suitable for microwave drying and/or calcination. The density of the porous structure can provide a measure for the amount of material with respect to the amount of voids in the porous structure, formed by the interconnected pores. A material density of the build material being used in the extrusion based manufacturing may also be taken into account.

The microwave energy (frequency, power, pulsation, exposure time and/or exposure profile) can be adapted based on the density of the porous structure being manufactured. Optionally, the applied microwave energy is increased for a porous structure with a higher density (e.g. smaller interconnected pores). The increase of microwave energy applied can be achieved by a higher energy amplitude and/or a longer exposure time. The density may relate to the arrangement of the interconnected filaments in the plurality of stacked layers of the porous structure. This filament arrangement is known to the additive manufacturing device, and can thus be used for determining the optimal microwave energy to be applied for providing adequate drying and/or calcination during the heat treatment while reducing the risk of damaging or deforming the porous structure in the process.

Optionally, the applied microwave energy is selected based on at least one of: the affinity of the solvent for one or more of the components of the paste composition, the paste composition, the nature of the solvent, the concentration of one or more of the solvent, moisture and organic material in the three-dimensional porous structure.

Optionally, the porous structure is one or more of a mesh, a lattice structure, a filament network, a scaffold, a filament framework, a filament patterned arrangement.

Optionally, the applied microwave energy is selected based on the porosity of the porous structure, which can be further dependent on both the intra- and inter filament porosity.

The porosity may include porosity of the structure as a whole and porosity of the individual filaments. The pore volume of the filaments may usually be small in comparison to the pore volume of the structure. Porosity can be for instance measured in form of a fraction or percentage, for instance the ratio of voids to a total volume of the porous structure. However, the porosity of the porous structure may be varied such as to locally influence the mechanical strength and permeability of the porous structure. The design, geometry and/or arrangement of the filaments can for example be employed for affecting the porosity and the mechanical properties of the porous structure at predetermined locations of the porous structure.

The arrangement of the filaments and the filament position and orientation gives a range of pore shapes and thus influences the porosity of the porous structure. The applied microwave energy can be chosen based on the resulting porosity of the porous structure.

Optionally, the applied microwave energy is selected based on at least one of: an intra filament porosity, a filament-to-filament distance, a filament diameter, a filament thickness, a filament lay down angle, a filament lay down pattern, a filament placement interrelation, a geometry formed by the deposited filaments, a number of stacked layers, a porosity or one or more dimensions of the porous structure.

The porous structure possesses well-defined pores. The filament-to-filament distance between adjacent filaments differs based on the chosen infill density. As the infill density increases, the filament-to-filament distance (e.g. center-to-center spacing of adjacent filaments) decreases. The printing infill density and thus porosity can be (locally) varied. The infill density defines the amount of material filled into the object and subsequently relates to the porosity of the 3D printed structure. The infill density can range from 0% to 100%, where 0% results in a completely hollow object and 100% infill results in a completely solid object. These parameters may influence the drying and/or calcination efficiency using microwaves. By selecting the microwave energy based on these parameters of the porous structure, the microwave drying and/or calcination process can be significantly enhanced. This process can be performed rather automatically as the parameters are known when the porous structure is being manufactured by the additive manufacturing device.

Different infill patterns can be employed (triangular, square, hexagonal, etc.). It will be appreciated that the term filament-to-filament distance may be understood as a spacing between two adjacent filaments within a same layer. This spacing may be a center to center distance or an edge to edge distance between two neighboring filaments. Other terms may also be used for this feature, such as for example, filament spacing, interspacing, filament gap, etc. Various filament diameters can be used.

The size of the filaments and thereby the porosity may be strongly affected by a nozzle travel speed and extrusion speed. Adjusting the mass flow rate of the material being extruded may for example be achieved by adjusting the extrusion pressure and/or the extrusion speed during extrusion.

Microwave drying and/or calcination may provide an advantageous drying and/or calcination process in which a more uniform heating of the porous structure is obtainable, throughout the full thickness of the material. The applied microwave energy can be based on parameters influencing the pores of the porous structure.

Due to the occurrence of volumetric heating in microwave assisted drying and/or calcination, gases generated inside the material can escape the porous material via the pores. However, the arrangement or configuration (e.g. pattern of deposited filament architecture) of the porous structure may affect the drying and/or calcination process significantly. By taking the arrangement or configuration of the porous structure into account, the microwave drying and/or calcination process can be better controlled. Hence, deformations or damage to the porous structure can be better prevented during the drying and/or calcination process. Furthermore, an improved overall quality and/or strength of the filament arrangement can be obtained after the microwave drying and/or calcination process.

The structural geometry of the porous structure can be determined by the position and orientation of individual filaments. Filaments are frequently oriented at 0° and 90° on alternate layers. This arrangement is also known as "0/90 orientation". However, many variant arrangements are possible, for instance 0/60/120 orientation in which filament orientations are changed by 60° on each subsequent layer. For porous structures with a 0/90 filament orientation, porosity can be considered as a series of long intersecting columnar pores. Alternatively, pores may more closely resemble the geometry of a spiral staircase for a 0/60/120 filament orientation. Many other filament orientations are possible resulting in different pores of the porous structure. The microwave drying and/or calcination process can take into account the structural geometry of the porous structure to be dried.

Other aspects of filament positioning can also be varied. For instance, the filaments can be aligned or staggered. In an aligned arrangement of filaments, the filaments are aligned directly above similarly oriented filaments on lower layers. In a staggered arrangement of filaments, the filaments are staggered in an alternating manner by off-setting their horizontal position. These filaments form offset layers and/or diagonal pores. Furthermore, it is also possible that several identical layers are printed before the filament orientation is changed. These properties of the manufactured porous structure may also be taken into account for microwave drying and/or calcination the porous structure.

In a preferred embodiment, interconnected filaments of the paste composition are deposited in a predetermined arrangement in a plurality of consecutive stacked layers, wherein the filaments of the consecutive layers are connected to one another at least at contact points between filaments of consecutive layers to obtain the porous structure with interconnected pores between the filaments, wherein several less frangible regions are formed in the arrangement of filaments and wherein one or more preselected frangible regions are formed in the arrangement of filaments. Optionally the filaments are deposited such that the one or more frangible regions of the porous structure are connected to one or more of the less-frangible regions of the porous structure, wherein the predetermined arrangement of interconnected filaments is configured such that the one or more frangible regions form structurally weakened zones of the porous structure such that the porous structure breaks along said one or more frangible regions under influence of a bending load and/or a bending induced stress which does not break the less frangible regions to release parts formed by the less frangible regions.

The porous structure may have at least one frangible region and at least one less-frangible region connected to each other in the specific arrangement of the deposited filaments. The specific arrangement (e.g. positioning, buildup, interlayer and intralayer arrangement, etc.) of the interconnected filaments results in a variation of the local mechanical properties of the porous structure such that the frangible and less-frangible regions (cf. non-frangible regions e.g. under predetermined or normal load/stress conditions) in the porous structure can be formed. For this purpose the arrangement of the porous structure is adapted to incorporate weaker frangible zones within the porous structure being formed.

Frangible regions are understood to correspond to regions which are more frangible than the less frangible regions. The less-frangible regions may be substantially non-frangible under predetermined load/stress conditions. The stress can for instance be an external stress, and/or an internal material stress e.g. triggered by temperature change, or microwave irradiation etc.). Optionally, the applied microwave energy is selected such that breaking of at least part of the frangible regions is induced when exposed to the microwave irradiation.

The porous structure may comprise filaments having one or more less frangible regions and one or more frangible regions, and the porous structure may be heated by means of the applied microwave energy from an initial temperature to an elevated temperature to cause breaking of at least part of the more frangible regions of filaments at a desired position.

Alternatively, the porous structure comprises filaments having one or more less frangible regions and one or more frangible regions, and the porous structure may be heated by means of the applied microwave energy from an initial temperature to an elevated temperature at which the mechanical structure of the filaments is not affected, i.e. both the frangible and the less frangible regions are not affected.

Optionally, the applied microwave energy is controlled by adjusting at least one of: a microwave frequency, a microwave power, an irradiation duration, or a power profile (e.g. a microwave pulsation), of the microwave energy.

The porous structures are subjected to the microwave energy for reducing the moisture, solvent and/or organic material content. The microwave energy can be tuned in various ways. By taking into account the arrangement of the interconnected filaments of the porous structure for selecting the microwave energy to be applied, the drying and/or calcination process can be significantly enhanced. Different porous structures may require different drying and/or calcination conditions.

The microwave energy may for instance be adjusted by changing a total time duration of microwave irradiation. It can be advantageous to adapt the power profile of the microwave energy. This may for instance be the application of microwave power in function of time. For instance during only portions of a total time interval microwaves may be guided through the porous structure.

The output power of a microwave applicator (e.g. magnetron) in a drying and/or calcination process is one of the major factors to determine the quality of the dried porous structure. As a result of large variations of inherent properties, porous structures may react differently under microwave irradiation. Each porous structure may require a specific power scheme, which is affected by the size, quantity, moisture, solvent and/or organic material content, and/or other properties of the material from which the porous structure is fabricated. Furthermore, the arrangement of the filaments also plays an important role. Hence, the material density, both inter-filament and intra-filament, porosity, layer pattern, filament size, filament orientation, filament diameter, filament-to-filament distances, etc. can also be taken into account for determining the power scheme.

Optionally, the power profile is configured to provide pulsed microwaves with an intermittent microwave operation including on-cycles and off-cycles within a predefined time interval. Optionally, the consecutive pulses have the same or a different time length.

Whether the microwave heating is performed intermittently or continuously may impact the internal stress development of the porous structure during the drying and/or calcination process. For some porous structures, intermittent drying and/or calcination can largely mitigate the problems caused by continuous hot-air drying and/or calcination, such as cracks, damage, deformations, etc. When intermittent microwave heating is used, the maximum tensile and compressive stresses within the dried porous structure are decreased significantly. The time of the peak stresses to develop is also reduced.

In some examples, cracks may occur in porous structures with continuous microwave heating of a certain power profile. However, with a pulsation, crack formation can be effectively avoided or delayed at lower moisture, solvent and/or organic material contents, although the sample may not reach a higher temperature.

Pulsed microwave drying and/or calcination may provide additional energy efficiency and quality of the dried porous structure. The energy efficiency and product quality can be improved with a longer ratio of the power-off to power-on time. For example, when the power-on time is shorter, more of the microwave energy may be used to evaporate moisture, solvent and/or organic material, whereas when the power-on time is longer, the product temperature may tend to increase, leading to a loss of quality of the heat sensitive porous structure.

In case of intermittent microwave heating (e.g. pulsed microwave drying and/or calcination), the temperature of the porous structure does not increase constantly. The temperature of the porous structure is usually lower than with continuous heating, while the moisture, solvent and/or organic material content at different points of the body of the porous structure tend to be more uniform. This uniformity implies that, advantageously, drying and/or calcination induced stresses can be decreased.

Therefore, by means of the intermittent microwave drying and/or calcination, shrinkage behavior of the porous structure may be reduced. Intermittent microwave drying and/or calcination can improve the quality and temperature distribution. Drying and/or calcination by intermittent microwave input can provide a product with a better quality than continuous microwave input for drying and/or calcination.

The microwave energy applied to the chamber containing the porous structure is important for controlling the drying and/or calcination process. The larger the microwave energy (e.g. higher power density) applied to the one or more porous structures, the shorter the required drying and/or calcination time. However, if the microwave power is too high, for a too long period of time, the temperature may become too high to permit optimal escape of moisture, solvent and/or organic material from the structure upon heating, resulting in damage or deformation of the porous structure. A too low applied microwave power may result in a detrimental extension of the required period of time for achieving the desired drying and/or calcination of the one or more porous structures.

Optionally, the power of the microwave drying and/or calcination is pulsed on 0.1 seconds up to 10 minutes or up to 5 minutes, preferably 0.1 seconds up to 2.5 minutes, more preferably 0.1 up to 60 seconds and off respectively 0.1 seconds up to 5 minutes, preferably 0.1 seconds up to 2.5 minutes, more preferably 0.1 up to 60 seconds 0.1 to 60 seconds. Fast drying of the printed paste may be preferred as this ensures that the material remains in place and may provide a structural network which delimits the pores. Besides this, crimping of the printed structure may be counteracted.

Optionally, the microwave energy is applied in consecutive cycles and wherein the microwave energy applied in a first cycle is different from the microwave energy applied in a second cycle consecutive to the first cycle.

Optionally, the heat treatment includes a plurality of microwave drying and/or calcination stages, wherein in a first stage the microwave energy has a first microwave power with a first energy density, and wherein in a successive second stage the microwave energy has a second microwave power with a second energy density, the first energy density being lower than the second energy density.

Optionally, the porous structure is heated by means of the applied microwave energy from an initial temperature to an elevated temperature, wherein the microwave energy is controlled in order to keep the elevated temperature below specific morphology or phase change temperatures of the porous material. In some examples, below 600° C., preferably below 300° C., more preferably below 100° C. and most preferably below 60° C.

The temperature of the porous structure may be monitored such as to control or adjust the applied microwave energy in order to obtain an elevated temperature of the porous structure not exceeding 600° C., preferably below 300° C., more preferably below 100° C. and most preferably below 60° C. In this way, a loss of quality of the formed porous structure may be avoided. It may also be prevented that some parts of the porous structures would reach significantly higher temperatures than other parts of the porous structure.

Optionally, the pressure in the microwave chamber is sufficiently low to ensure that the temperature of the porous structures does not exceed 600° C., preferably 300° C., more preferably 100° C. and most preferably 60° C.

Optionally, a temperature of the porous structure is monitored using a temperature sensor, preferably being an infrared temperature sensor, wherein a control system with a temperature feedback is provided which is configured to adjust the microwave energy (e.g. power) dynamically according to the determined temperature of the porous structure.

Optionally, the heat treatment involving irradiating microwave energy is followed by a heating step to cause sintering of the three-dimensional porous structures.

An intelligent power control can be obtained with a real-time feedback temperature measurement. Optionally, the microwave energy is adjusted at each time instant (e.g. real-time control). An infrared sensor enables a nondestructive measurement of the temperature of the porous structures. Additionally or alternatively, a thermocouple can be used for measuring the temperature at the porous structure.

Optionally, the porous structure is dried with microwave energy having a microwave power density in a range of 0.01-10000 kWh/kg, preferably 0.1-1000 kWh/kg, more preferably 0.1-100 kWh/kg, most preferably 0.3-5 kWh/kg. The power density may be a fixed power density or a time-averaged microwave power density (e.g. intermittent).

Optionally, the microwave heat treatment is performed with air having a temperature in a range of 50-350° C., preferably 60 to 200° C.

Optionally, the microwave energy treatment is performed in vacuum with a pressure in a range of 1 Pa to 101325 Pa, preferably under reduced pressure with a pressure in the heat chamber in a range of 1000 to 101325 Pa.

Optionally, the heat treatment is performed, in vacuum with a pressure in the heat chamber in a range of 1 to 1000 Pa.

Vacuum microwave-assisted drying and/or calcination of a porous structure formed by extrusion based additive manufacturing can provide various advantages. A higher vacuum pressure (i.e. less vacuum) can result in a longer drying and/or calcination time and a higher temperature required for drying and/or calcination as the porous structure to be dried is to be subjected to a higher temperature for evaporating moisture, solvent and/or organic material (e.g. water) therein. In some examples, a moisture trap is employed for collecting the evaporated moisture.

The higher temperature to which the porous structures are subjected, the more likely the porous structures are to become damaged or deformed during the drying and/or calcination process. In some examples, it can be preferred to use a higher achievable vacuum and reduce the time and temperature required to dry the porous structures to thereby reduce the risk of damaging or deforming the porous structure.

Drying and/or calcination time can be controlled by the amount of vacuum and the microwave power applied to the porous structures positioned in the vacuum drying and/or calcination chamber. In some examples it may be preferred to operate the vacuum chamber using the lowest vacuum pressure (and thus the lowest drying and/or calcination temperature) and the highest application of microwave power provided that the power is not applied to the extent that it causes damage to the porous structures being treated and that it completes the drying and/or calcination quickly while subjecting the porous structures to a minimum required drying and/or calcination temperature. The vacuum and power applied can be tuned to obtain the required drying and/or calcination without inducing damage or a deformation to the porous structure.

Optionally, the heat chamber is a vacuum microwave drying and/or calcination chamber in which one or more porous structures can be loaded.

Optionally, wherein the heat treatment includes a plurality of microwave drying and/or calcination stages, wherein in a first stage the microwave energy has a first microwave power with a first energy density, and wherein in a successive second stage the microwave energy has a second microwave power with a second energy density, the first energy density being lower than the second energy density. It will be appreciated that more stages can be performed.

The microwave drying and/or calcination can induce a moisture, solvent and/or organic material migration from the porous structure. Moisture, solvent and/or organic material in the porous structure can steadily decline with time. However, continued drying and/or calcination can eventually cause the average moisture, solvent and/or organic material content inside the porous structure to decrease and lead to decreased microwave energy absorbed, reducing the increasing of temperature and evaporation rate. An escape rate of moisture, solvent and/or organic material from the filament/porous structure may be diffusion limited.

When the porous structure approaches 1 to 3 mass percentage moisture, solvent and/or organic material content, a second stage of microwave drying and/or calcination can be applied wherein the application of microwave power is reduced significantly, for example by at least 10%, more preferably by at least 25%, even more preferably by at least 50%.

According to another preferred embodiment, in a first stage lower microwave energy may be used, while in a later second stage a higher microwave energy may be used. This way drying of the printed structure in a first stage may proceed somewhat slower, whereafter any remaining unwanted material may be removed using higher microwave energy.

Optionally, the porous structure is uniformly irradiated with microwave energy during the heat treatment.

A uniform field distribution can result in a uniform heating pattern. The field distribution may depend on the cavity size, product geometry of the one or more porous structures, the dielectric properties of the material to be processed, the microwave guide of the microwave applicator, etc. A non-uniform heating pattern can be prevented by changing the field configuration by for example varying cavity geometries (e.g. mode stirrer) and/or by moving the product (on a conveyer belt or turntable). It is also envisaged that a microwave applicator is employed arranged for providing a substantially uniform microwave field directed towards the one or more porous structures to be microwave heat treated.

A uniform microwave field may be considered as a uniform distribution of the microwave energy over a volume in which the porous object is placed, wherein a difference of microwave energy throughout the volume is limited over a predetermined period of time. For instance the difference may be smaller than 30 percent, more preferably smaller than 20 percent, even more preferably smaller than 10 percent.

Optionally, the temperature during heat treatment is elevated to a temperature in a range between 25° C. to 800° C., preferably 25-600° C., more preferably 50-500° C., even more preferably 50-300° C., most preferably 60-200° C. In this way, a more uniform heating may be achieved while the drying and/or calcination time can be significantly shortened. In this way, a more uniform heating may be achieved while the drying and/or calcination time can be significantly shortened.

Optionally, the three-dimensional porous structure is subjected to microwave irradiation with a uniform energy density.

Optionally, the microwave energy applied to the porous structure is variable, and is preferably varied with one or more of the following parameters: a geometry of the one or more three-dimensional porous structures, or the dielectric properties of the paste composition.

Optionally, the three-dimensional porous structure is subjected to at least one supplementary drying and/or calcination treatment.

Optionally, the at least one supplementary drying and/or calcination treatment is carried out in advance of the microwave treatment, after the microwave treatment, and/or between consecutive microwave treatments.

Optionally, the microwave drying and/or calcination is combined with one or more other drying and/or calcination methods which can improve the drying and/or calcination efficiency and product quality compared to using microwave drying and/or calcination alone. Incorporating a supplementary drying and/or calcination system with the microwave drying and/or calcination system, a hybrid microwave system can be obtained which can considerably enhance the drying and/or calcination rate and the final product quality.

Optionally, the drying and/or calcination step is performed on a batch of printed porous structures, wherein the applied microwave energy is selected based on the arrangement of the interconnected filaments of the printed porous structures in the batch.

Optionally, at least one three-dimensional porous structure is continuously moved through a microwave field.

Optionally, porous structure is placed on a heated base. In this way, the drying process can be further improved.

According to an aspect, the invention provides for an additive manufacturing system for manufacturing a three-dimensional porous structures, the system including:
- an extrusion unit configured to receive a paste composition comprising particles of at least one inorganic material, at least one polymeric binder and at least one solvent, wherein the extrusion unit is arranged for depositing filaments of the paste composition in a predetermined interconnected arrangement in a plurality of consecutively stacked layers for forming a three-dimensional porous structure with interconnected pores between the filaments,
- a heat treatment unit arranged for subsequently drying the deposited three-dimensional porous structure by subjecting the porous structure to a heat treatment by irradiating microwave energy through said porous structure,
- and a control unit configured to select the applied microwave energy employed during the heat treatment based on the structural interconnected arrangement of the filaments defining the shape and size of the pores of the three-dimensional porous structure.

The temperature variation of a porous structure being microwave dried can be a critical factor for the quality of the final dried product. A microwave power control method can be used for optimizing the drying and/or calcination process for particular porous structures to be dried. The invention can employ a fast-switching feedback power control scheme with a real-time temperature monitoring capability during the microwave drying and/or calcination process.

A microwave applicator may be configured to generate and introduce microwave energy to the porous structure to be heated. A microwave application may include a microwave power generator (usually a magnetron), a waveguide, and a microwave chamber/cavity where the porous structures are to be processed. The microwave power generator generates the desired high-frequency microwave radiation. This conversion can be achieved by a magnetron which can be shielded for safety and to prevent leakage of harmonic radiation. The waveguide is configured to transmit microwave energy through free space and deliver it to the porous structure to be treated. The waveguide can be a structure which is arranged to direct the propagation of energy in the form of an electromagnetic wave along a predetermined path.

The microwave power may have frequencies of 2.45 GHz or 915 MHz. These frequencies are commercially used in microwave ovens. It will be appreciated that other frequencies may also be employed.

Optionally, the heat treatment unit is arranged to minimize vibrations of a support surface supporting the porous structure.

According to an aspect, the invention provides for a microwave drying and/or calcination system for drying and/or calcination three-dimensional printed porous structures obtained from extrusion based additive manufacturing, wherein the drying and/or calcination system includes a heat treatment unit arranged for drying the deposited three-dimensional porous structure by subjecting one or more porous structures to a heat treatment by irradiating microwave energy through said porous structure, wherein the drying and/or calcination system is configured to: determine the one or more porous structure to be dried, and select the microwave energy being applied for drying and/or calcination the one or more porous structures based on identification of a structural interconnected arrangement of the filaments defining the shape and size of the pores of the one or more three-dimensional porous structures.

Conventional air drying and/or calcination, or oven drying and/or calcination usually give rise to a non-uniform heating of the porous structure. Microwave dehydration process for drying and/or calcination a printed porous structure by means of an extrusion based additive manufacturing process provides a number of advantages. The microwave drying and/or calcination can provide rapid drying and/or calcination at low temperatures and with minimum temperature distribution within the porous structure (uniform heating).

Conventional heating may require exposing the porous structure to a higher temperature for a prolonged period of time, long enough to remove the desired amount of moisture, solvent and/or organic material from the porous structure. This prolonged period of time is usually longer than the time required by microwave heating according to the invention. The longer heating time can give rise to unwanted material decomposition or conversion to unwanted by-products, which can advantageously be prevented by the invention.

Optionally, the heat treatment unit is arranged to minimize vibrations of a support surface supporting the porous structure.

According to an aspect, the invention provides for a control unit for operating an extrusion based additive manufacturing system for manufacturing three-dimensional porous structures, wherein the controller is configured to: operate an extrusion unit to deposit filaments in a predetermined interconnected arrangement in a plurality of stacked layers for forming a porous structure with interconnected pores, and operate a heat treatment unit to subject the porous structure to a heat treatment in a heat chamber in order to reduce a moisture, solvent and/or organic material content of the porous structure by irradiating microwave energy through said porous structure, and wherein the control unit is configured to select the applied microwave energy based on the arrangement of the interconnected filaments of the porous structure.

According to an aspect, the invention provides for a method of manufacturing three-dimensional porous structures, the method including: depositing filaments in a predetermined interconnected arrangement in a plurality of stacked layers for forming a porous structure with interconnected pores, subjecting the porous structure to a heat treatment in a heat chamber in order to reduce a moisture, solvent and/or organic material content of the porous structure by irradiating microwave energy through said porous structure.

In conventional heating, the material is heated by an external heat source (from outside the material to be heated), and the heat is transferred from the outside inward. In contrast to conventional heating, in microwave heating the material is irradiated with microwaves, resulting in a simultaneous internal heat generation. The microwave heating is based on the varying electric field induced oscillation, vibration and spinning of molecular dipoles (and hence the increase of molecular kinetic energy) as the material is subjected to a microwave irradiation.

Optionally, the heat treatment is performed to irradiate microwave energy uniformly. This can be achieved in various ways, for instance using a rotating plate in a microwave cavity, using an arrangement for directing substantially uniform microwaves in a plane, using a moving belt, etc. The skilled person may employ various ways for achieving a substantially uniform microwave irradiation.

According to an aspect, the invention provides for an additive manufacturing system for manufacturing a three-dimensional porous structures, the system including: an extrusion unit arranged for depositing filaments in a predetermined interconnected arrangement in a plurality of stacked layers for forming a porous structure with interconnected pores, a heat treatment unit arranged for subjecting the porous structure to a heat treatment in a heat chamber in order to reduce a moisture, solvent and/or organic material content of the porous structure by irradiating microwave energy through said porous structure. Optionally, the system includes a microwave applicator arranged for providing uniform microwave irradiation.

Microwave heating using a uniform microwave applicator provides deeper penetration and results in a more uniform heating pattern. Advantageously, the drying and/or calcination process is improved compared to the conventional drying and/or calcination system or known microwave drying and/or calcination systems.

The microwave dried and/or calcinated porous structures can have a better micro structure arrangement because of a more uniform energy absorption, heat distribution and moisture, solvent and/or organic material removal. The microwave drying and/or calcination is carried out with microwave energy based on the arrangement of filaments. In addition, improved mechanical properties can be obtained by the microwave heating for drying and/or calcination of the porous structures. Advantageously, the microwave drying and/or calcination according to the invention, can provide porous structures with higher strength and less deterioration in its performance.

Optionally, the temperature to which the porous structure are subjected during the microwave drying and/or calcination operation does not exceed 600 degrees Celsius, more preferably 300 degrees Celsius and even more preferably 100 degrees Celsius for any significant length of time so that damaging the porous structures is avoided as subjecting the porous structures to a temperature above 800 degrees Celsius can result in the porous structures to become damaged and/or developing cracks, or deformations.

According to an aspect, the invention provides for a computer program product configured for performing, when run on a controller, the steps of the method according to the invention.

According to an aspect, the invention provides for a data carrier comprising instructions configured for performing when run on a programmable apparatus of a controller, the steps of the method according to the invention.

Microwaves are electromagnetic waves with frequencies ranging from 300 MHz to 300 GHz, corresponding with a wavelength in a range of 1 millimeter to 1 meter.

Optionally, the porous structure is dried with microwave energy having a microwave power density in a range of 0.01 to 10000 kWh/kg, more preferably 0.1 to 100 kWh/kg, even more preferably 0.3 to 5 kWh/kg.

The use of low microwave power, i.e. below 1 kW/kg, is not preferred as the process may become too slow and the porous structures may become damaged or deformed. Application of high microwave power, i.e. above 500 kW/kg, is also not preferred as it may make controlling the uniformity of the drying and/or calcination process at low moisture, solvent and/or organic material content (i.e. below 5% moisture, solvent and/or organic material) more difficult. In some examples, an application of microwave power of about 5 to 500 kW/kg, e.g. about 10 kW/kg to 50 kW/kg is preferred.

According to an aspect, the invention provides for a method of manufacturing three-dimensional porous structure, the method including the successive steps of: printing a filament porous structure with interconnected pores having a specific filament arrangement; bringing the porous structure in a microwave drying and/or calcination chamber; and drying and/or calcination the porous structure by applying microwave energy. The applied microwave energy can be based on the specific filament arrangement of the porous structure (e.g. pattern, lay down angle, interspacing, etc.). Advantageously, a custom microwave drying and/or calcination can be achieved reducing the risk of deforming or damaging the porous structure.

It will be appreciated that in some examples, the heat chamber can be integrated in the additive manufacturing system for manufacturing the porous structure. In this way, the printed porous structures can be easily dried while optionally taking into account the specific filament arrangement of the porous structure.

It will be appreciated that any of the aspects, features and options described in view of the methods apply equally to the system and the described porous structure. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
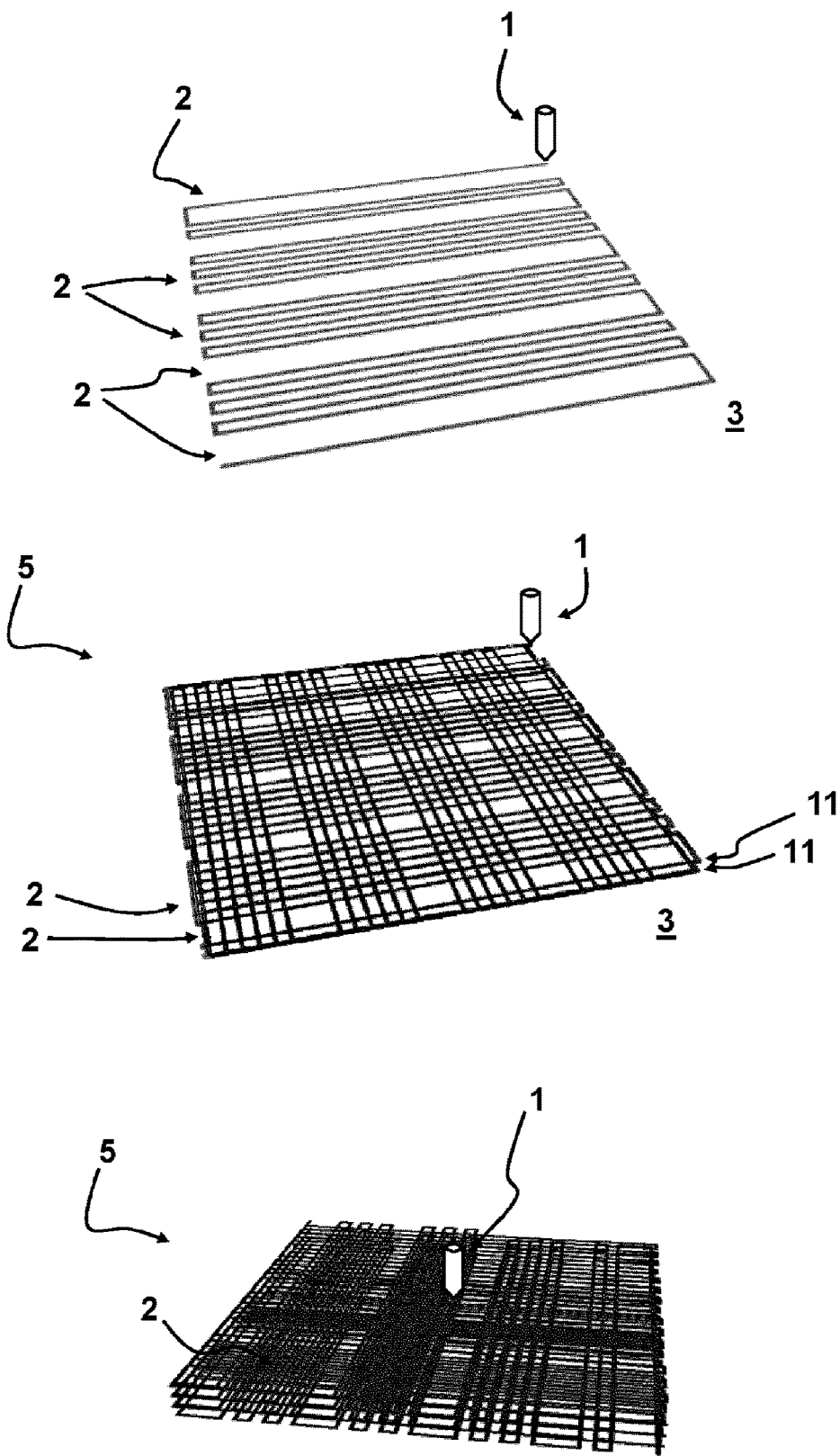
FIG. 1 shows a schematic diagram of an extrusion process.

FIG. 1 shows a schematic diagram of a print path in an extrusion process for manufacturing a three-dimensional porous structure 1. The print path illustrates how the filaments of the porous structure are deposited on the plurality of layers. The method includes depositing interconnected filaments in a predetermined arrangement in a plurality of stacked layers. The filaments of the consecutive layers are connected to one another to obtain the porous structure with interconnected pores. Furthermore, filaments of the consecutive layers are angled with respect to each other.

In the extrusion process, a nozzle 1 is scanned along a print bed 3 depositing filaments following the shown print path 5. It will be appreciated that it is also envisaged that the print bed 3 is moved instead of the nozzle 1 (kinematic inversion). A combination is also possible. In an alternative example, both the nozzle 1 and the print bed 3 can be moved during at least portions of the deposition process.

The additive manufacturing method of this invention may also be referred to as 3D printing, 3DFD, fibre deposition, filament deposition, robocasting, micro-extrusion etc., or a combination of two or more of these.

In FIG. 1a, the print path 5 for the first layer on the print bed 3 is shown. In FIG. 1b, the print path 5 of two layers are shown. In FIG. 1c, the print path 5 is shown in which the fourth layer is being deposited. It will be appreciated that large variety of print path arrangement are possible for obtaining the arrangement of the interconnected filaments of the porous structure.

By altering the deposition pattern, the local mechanical properties of the porous structure can be locally changed, so that a different heat treatment for drying and/or calcination may be required. In this example, the porous structure being printed has a non-homogeneous filament-to-filament distance (interspacing). Homogenous interspacing is also possible.

In the embodiment, in a first step, the filaments are first deposited in a predetermined interconnected arrangement in a plurality of stacked layers for forming a porous structure with interconnected pores. In a second step, the formed porous structure is subjected to a heat treatment in a heat chamber in order to reduce a moisture, solvent and/or organic material content of the porous structure by irradiating microwave energy through said porous structure. The applied microwave energy can be based on the arrangement of the interconnected filaments of the porous structure.

It will be appreciated that the second step may be performed during the first step. However, in some examples, the second step may be carried out at least partly simultaneous with the first step. It is also possible that a portion of the porous structure is formed followed by microwave drying and/or calcination, after which a further portion of the porous structure is formed.

Microwave-assisted drying and/or calcination results from heating via vaporization of liquids or volatile compounds formed upon thermally induced calcination (degradation) reactions using microwaves. The temperature of the material of the porous structure can be initially T1 and be raised to T2 sufficient for achieving a reduction of the moisture, solvent and/or organic material content of the porous structure. The microwave drying and/or calcination process offers advantages of energy-saving rapid drying and/or calcination rates, short processing times, deep penetration of the microwave energy, instantaneous and precise electronic control, and/or a clean heating process.

During a microwave drying and/or calcination process the local temperature (and pressure) can rise continuously speeding up the drying and/or calcination process. However, side effects such as degradation, deformations, physical damage can be prevented or reduced as the arrangement of the interconnected filaments of the porous structure are used for determining the microwave energy to be applied. The microwave applicator can be arranged to provide a uniform microwave radiation towards the porous structure in order to obtain a uniform temperature distribution in the treated porous structure.

Figure 2:
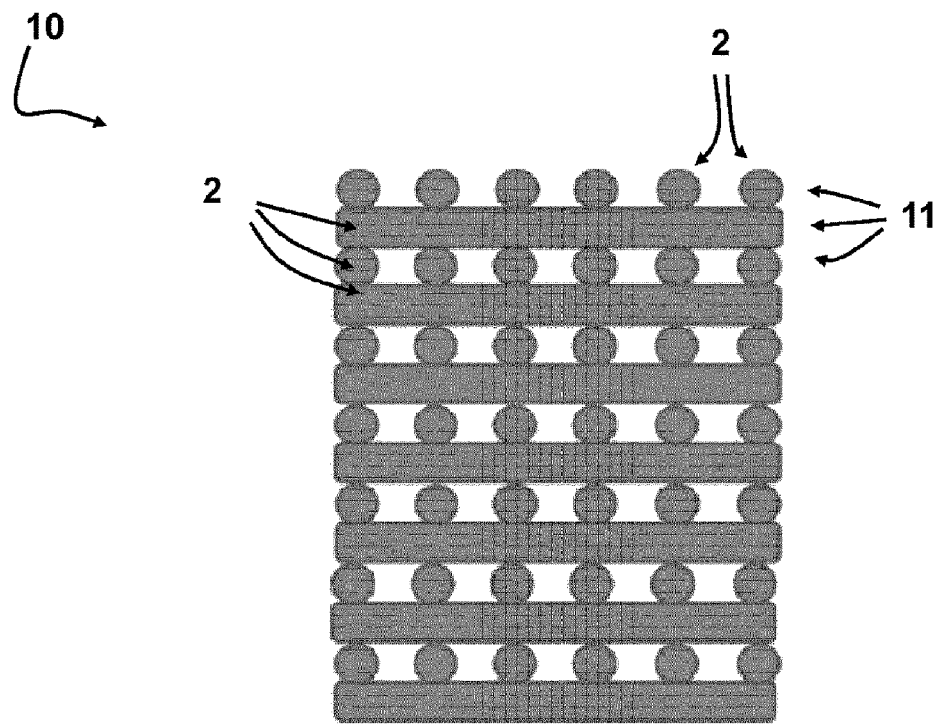
FIG. 2 shows a schematic diagram of an embodiment of a porous structure.
Figure 2:
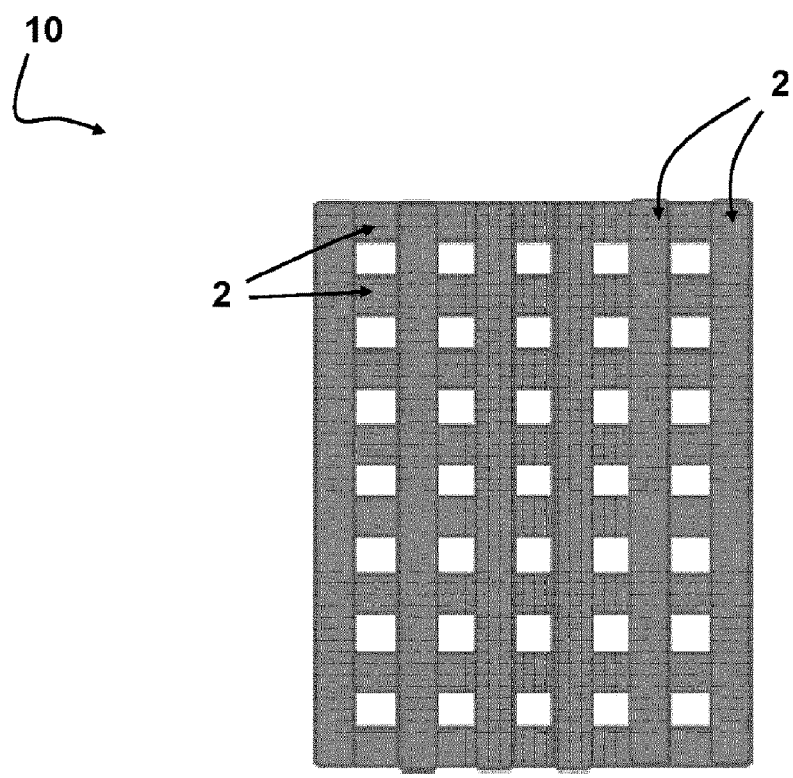

FIG. 2 shows a schematic diagram of an embodiment of a porous structure 10 obtained by depositing filaments 2 in a predetermined interconnected arrangement in a plurality of stacked layers 11 for forming a porous structure 10 with interconnected pores. In FIG. 2A, a cross sectional side view of the porous structure 10 is shown. In FIG. 2B, a cross sectional top view of the porous structure 10 is shown.

The porosity influences the stiffness or elastic modulus (cf. Young modulus), which is a measure of rate of change of stress over strain, defining how much a material deforms in response to a given force. Whether the filaments 2 are aligned or staggered also impacts the mechanical properties of the porous structure. For instance, a porous structure 10 with staggered filaments 2 may have a lower elastic modulus than a porous structure 10 with aligned filaments 2. For example, for a aligned filament arrangement (as shown in this example), there can be a solid column from top to bottom of the porous structure, which exists because the filaments 2 intersect at similar positions. This solid column can strongly resist compression. In contrast, for a staggered filament arrangement, the filaments 2 may bend slightly and stress can be concentrated at hinge points.

Furthermore, the filament orientation can also influence the mechanical properties of the porous structure. For instance, a porous structure with a 0/90, 0/60/120 and 0/45/90/135 filament orientation may have different elastic moduli. It will be appreciated that other lay-down patterns are also envisaged, such as for example triangular, rectangular, hexagon, curved, zigzag patterns. These lay-down patterns can also influence the pore size.

In the arrangement of filaments, one or more frangible regions and one or more less frangible regions may be formed. The one or more frangible regions may be connected to less-frangible regions. The one or more frangible regions form structurally weakened zones of the porous structure such that the porous structure breaks along said one or more frangible regions under influence of a load and/or a stress which does not break the less frangible regions, for example a material stress triggered by exposing the structure to microwave irradiation. The less-frangible regions of the porous structure have mechanical properties enabling it to withstand forces during the breaking of the more-frangible regions. Frangible regions are understood to correspond to regions which are more frangible than the less frangible regions. Optionally, the one or more frangible regions form frangible connections which are configured to enable breakoff of at least a first less-frangible portion of the porous structure from a second less-frangible portion of the porous structure along the one or more frangible regions. Optionally, the mechanical strength of the frangible regions within the porous structure may vary in order to allow a stepwise breakoff of various portions of the porous structure upon applying increasing loads and/or with increasing stresses. The less-frangible regions may be recovered separately after breaking of the frangible regions.

The presence of frangible regions and less frangible regions may for example permit constructing a large number of less-frangible units at the same time—which may then be separated by exposing the printed structure to microwave irradiation with the purpose of breaking the frangible regions. In such a three-dimensional structure comprising several less frangible regions connected by frangible regions, the filaments may be formed in longer lengths, the number of turns and start-stop points and turns, which each time involve acceleration and deceleration of the filament deposition device, is reduced. The filament deposition device can therefore continue to deposit build material at a certain deposition rate, for a longer period of time, without requiring acceleration or deceleration.

The porous structure contains several three-dimensional parts, at least two, preferably at least four, more preferably at least eight, or even more. Arrangement may differ: adjacent positioning in length direction or divided over three dimensions. The parts may be arranged in the porous structure according to a regular or an irregular geometric arrangement. Units may have same or different dimensions and shapes.

The drying and/or calcination processes may be an important post processing step when porous structures have been printed using an extrusion based additive manufacturing. The porous structure 10 being formed is subjected to a heat treatment in a heat chamber in order to reduce a moisture, solvent and/or organic material content of the porous structure 10 by irradiating microwave energy through said porous structure 10. The applied microwave energy is selected based on the arrangement of the interconnected filaments 2 of the porous structure 10. A different arrangement of the interconnected filaments 2 (e.g. different lay down angle, different filament-to-filament distance, etc.) can result in a different microwave energy to be applied on the porous structure during the heat treatment. For example, a reduced porosity of the porous structure 10 can result in a reduced amount of microwave energy being applied on the porous structure 10. The heating can be performed while preventing excessive temperatures being developed along the corners or edges of the dried products, which would result in burning and/or byproduct production.

Figure 3:
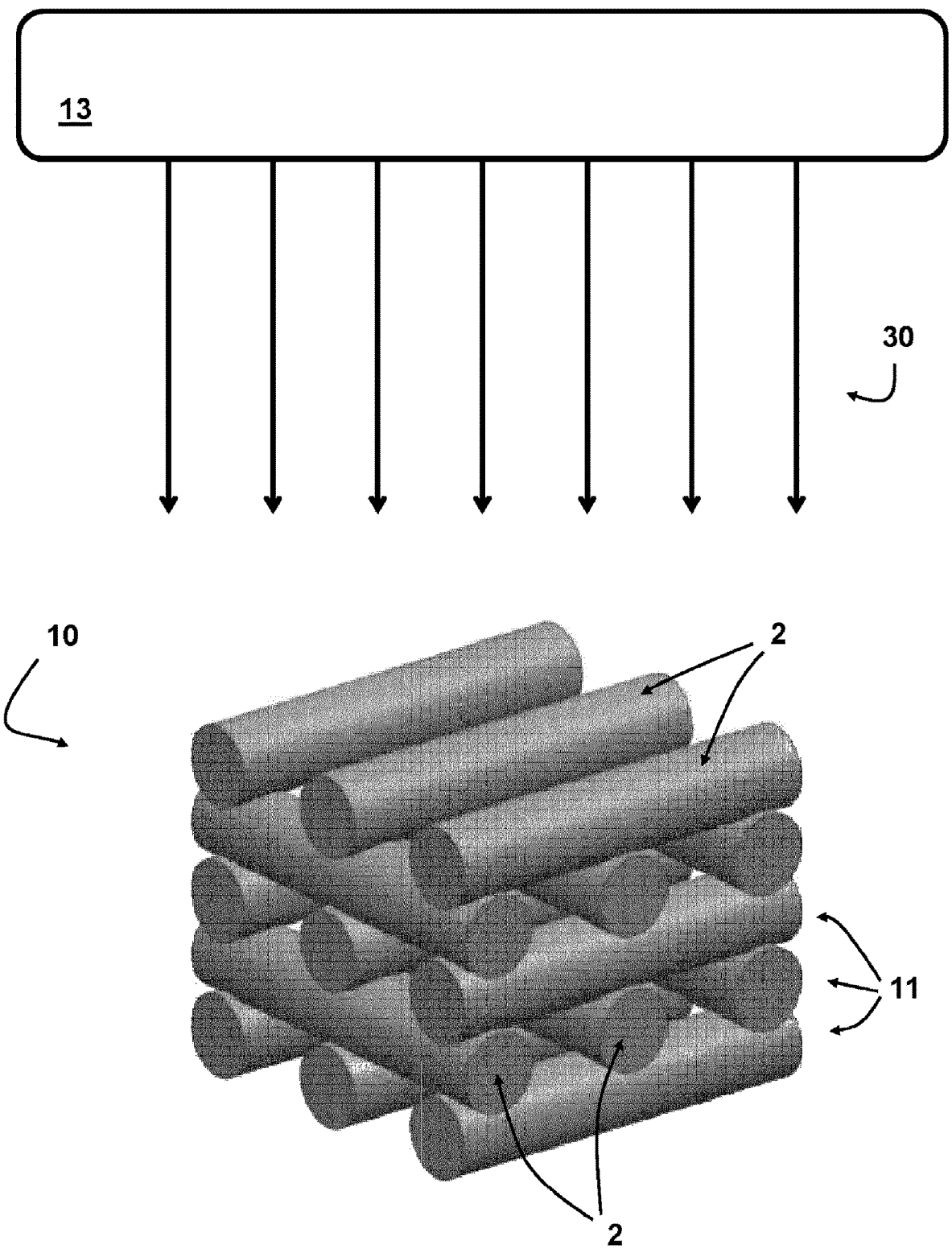
FIG. 3 shows a schematic diagram of microwave drying and/or calcination of a porous structure.

FIG. 3 shows a schematic diagram of microwave drying and/or calcination of a porous structure 10 being microwave dried and/or calcinated using a microwave applicator 13. The microwave applicator 13 is configured to provide microwave energy 30 which is directed towards the porous structure 10. Oscillated microwave energy can be absorbed into the material of the porous structure 10 such that internal heat generation can occur.

The porous structure 10 includes a plurality of filaments 2 being distanced from each other in a plurality of stacked layers 11. As a result of the specific arrangement of the filaments 2, the porous structure 10 forms a plurality of voids (i.e. empty space) which form interconnected pores of the porous structure 10.

The microwave drying and/or calcination provides particularly good results when used for drying and/or calcination porous structures 10 with interconnected pores. The particular arrangement of the filaments 2 in the plurality of stacked layers can affect the drying and/or calcination process. By selecting the applied microwave energy based on the arrangement of the interconnected filaments of the porous structure, the drying and/or calcination induced stresses can be further reduced. An internal moisture, solvent and/or organic material can be allowed time for being distributed through the interconnected pores of the porous structure 10. The information about the arrangement of the interconnected filaments of the porous structure 10 is known from the extrusion based manufacturing process. This information can advantageously be fed to the drying and/or calcination unit such as to adapt the microwave drying and/or calcination parameters. In this way, a custom microwave drying and/or calcination can be obtained taking into account the specific arrangement of the filaments of the porous structure 10.

Different microwave control methods can be utilized, such as intermittent methods and continuous methods. Each method can provide a unique supply power profile of the applied microwave energy.

The microwave drying and/or calcination can result in a dried and/or calcinated porous structure 10 with less shrinkage. Advantageously, the risk for deformations or damage to the porous structure 10 during the heat treatment drying and/or calcination process can be effectively reduced.

In various examples, the microwave drying and/or calcination process can provide for a higher drying and/or calcination rate, shorter drying and/or calcination time, lower power consumption, and/or better quality of the printed porous structures.

Figure 4:
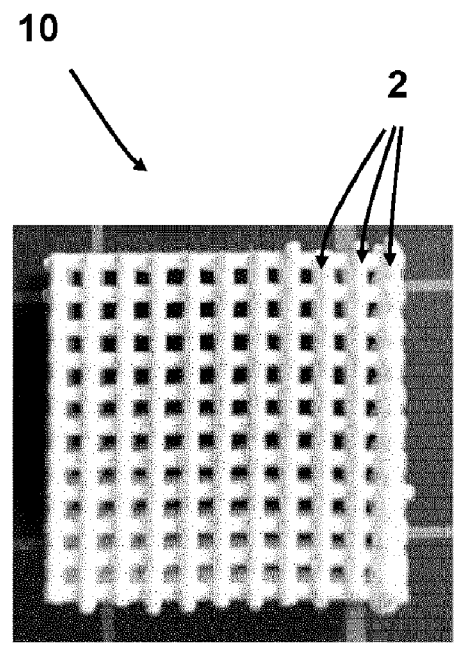
FIG. 4 shows a schematic diagram of an embodiment of a porous structure.
Figure 4:
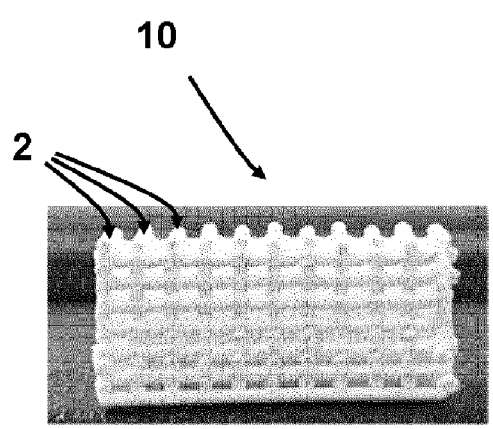

FIG. 4 shows a schematic diagram of an embodiment of a porous structure 10 having a plurality filaments. A top view and a side view is shown in FIG. 4A and FIG. 4B, respectively. The porous structure 10 has a specific arrangement of filaments 2. The particular filament arrangement parameters, such as filament-to-filament distance, filament diameter, lay down angle, number of stacked layers, and dimensions of the filaments and porous structure result in a particular arrangement of the interconnected filaments of the porous structure 10. The applied microwave energy is selected based on the particular arrangement of the interconnected filaments of the porous structure 10 determined by the filament arrangement parameters. Also material properties of the build material can be taken into account for selecting the applied microwave energy.

The microwave drying and/or calcination offers many advantages, including rapid heating rates and short processing times, which results in energy savings. Furthermore an unique and fine internal structural development can be obtained, which may improve many properties of the dried and/or calcinated material.

The porous structure 10 allows for deeper penetration of the microwave energy. The heat may be generated more efficiently without directly contacting the materials to be dried.

In some embodiments, a plurality of microwave drying and/or calcination stages are carried out for microwave drying and/or calcination the porous structure. For example, in a first stage, a microwave power of between 1 and 1000 kW/kg of porous structure can be applied, preferably 5 to 500 kW/kg preferably 10 to 100 kW/kg for a time required to reduce the moisture, solvent and/or organic material content to between 25% and 1% moisture, solvent and/or organic material based on a wet weight of the porous structures followed by a second stage at a lower microwave power level. As a result of the multi stage microwave drying and/or calcination, in some examples, the dried porous structures can have significantly improved structural quality. It will be appreciated that it is also envisaged that more than two stages are applied. The microwave energy applied can be based on the characteristics of the printed porous structure (e.g. pores, pattern, dimensions, shape, etc.).

Figure 5:
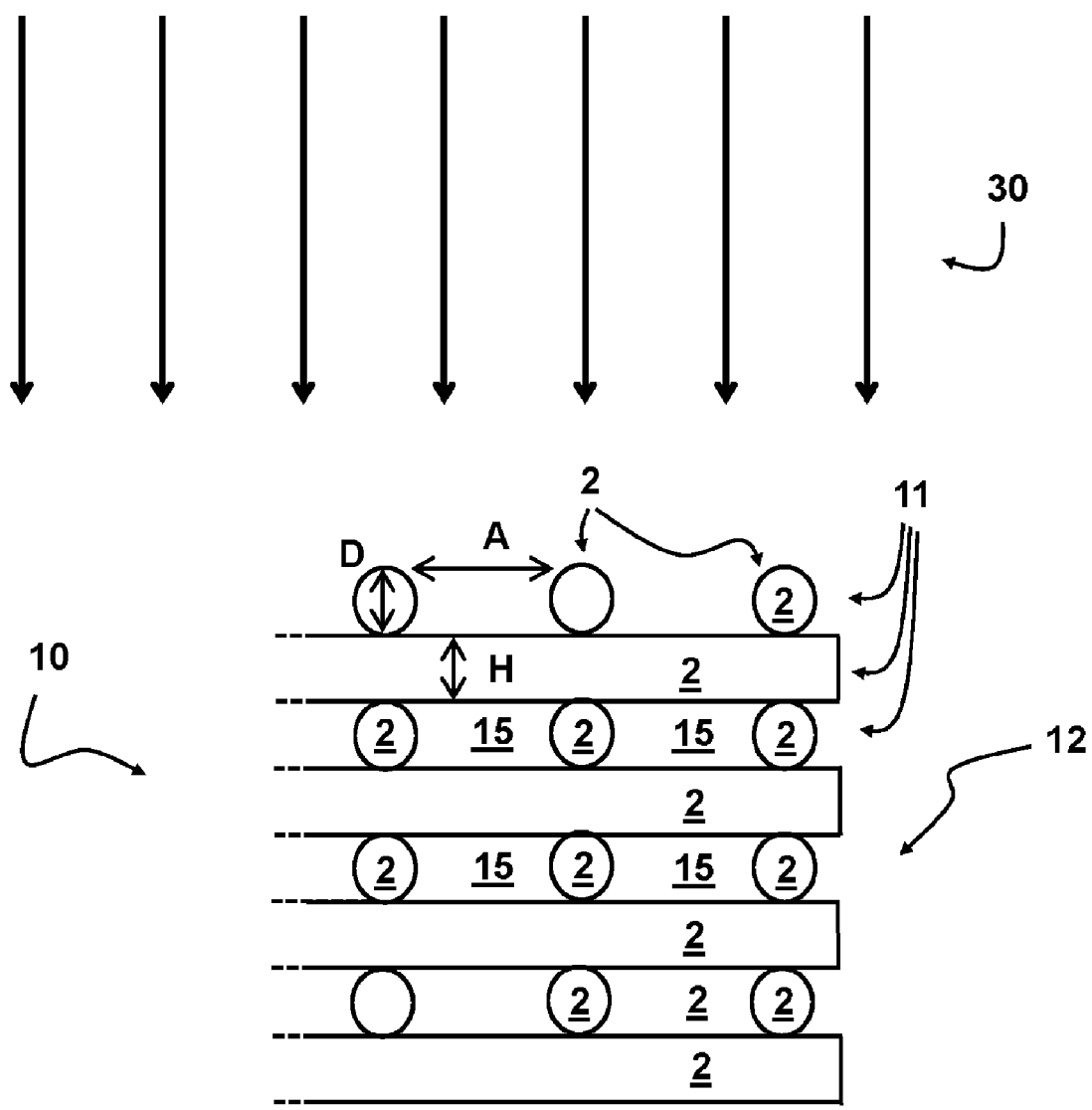
FIG. 5 shows a schematic diagram of an embodiment of a porous structure.

FIG. 5 shows a cross sectional side view of a schematic diagram of an embodiment of a porous structure 10 with a plurality of layers 11 of deposited filaments 2 stacked on each other. The porous structure 10 is subjected to microwave energy 30. Microwave drying and/or calcination is associated with dielectric loss of the material. A material can absorb energy when placed in a high-frequency electric field. Consequently, electric dipole polarization and conduction will be generated within a dielectric material composed of polar molecules with positive and negative poles. The orderly dispersed polar molecules vibrate instantaneously and violently in response to the alternating high-frequency electric field of the microwave. Resistance to molecular attraction and motion have to be overcome. The temperature of the material increases as friction generates heat. The microwave heating can improve heating uniformity. Moreover, an instantaneous and precise electronic control can be obtained by means the microwave heat treatment.

The filaments 2 have a filament diameter D and a filament-to-filament distance A. A layer may have a height H. This height may correspond substantially to the filament diameter D. However, variations are also possible.

A build material can be extruded in the form of a first layer, the first layer including a plurality of filaments 2. The filaments 2 may for instance be part of an elongated strand of deposited build material. In an example, the elongated strand is deposited continuously. However, a non-continuous deposition is also possible. Furthermore, one or more additional layers can be extruded, each additional layer being vertically stacked upon a previously extruded layer and also comprising a plurality of filaments 2 angled with respect to a number of filaments 2 of the previous layer. A predetermined pattern is dispensed so as to define the three-dimensional object being manufactured.

Instead of solid structures, a porous printed structure is microwave dried and/or calcinated, resulting in a more uniform heating while avoiding that an outer layer of the porous structure 10 would overheat. Advantageously, the incidence of drying and/or calcination imperfections can be reduced, providing better throughput and printability.

Design parameters such as filament gap, filament diameter and lay down angle play significant roles in controlling porous and mechanical characteristics. For instance, increasing the lay down angle can also increase the porosity which can influences the mechanical properties of the porous structure. The microwave energy applied during the microwave drying and/or calcination is selected based on the porous and mechanical characteristics of the porous structure.

The filament-to-filament distance creates voids within the porous structure. In some examples, the applied microwave energy can be based on the interspacing between adjacent filaments in the filaments arrangement.

Figure 6A:
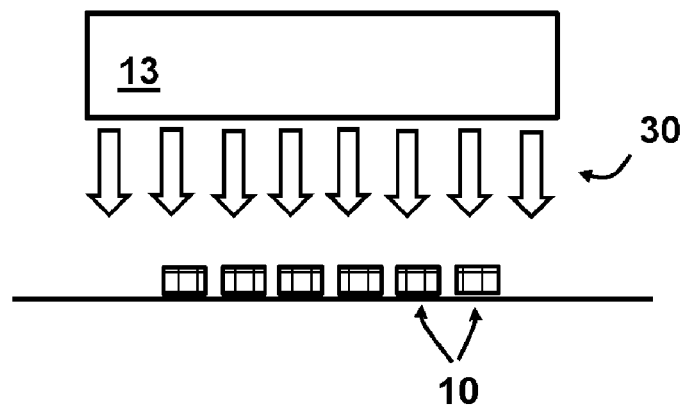
FIGS. 6a and 6b show a schematic diagram of microwave drying and/or calcination porous structures.
Figure 6B:
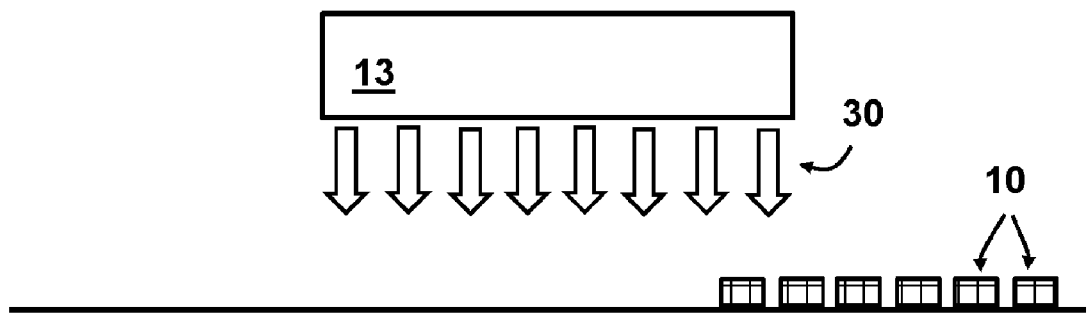

FIGS. 6a and 6b show a schematic diagram of microwave drying and/or calcination porous structures 10 being subjected to microwave energy. A plurality of porous structures are transported on a belt and guided through microwave radiation in order to achieve microwave drying and/or calcination. A substantially uniform power distribution along the surfaces of the porous structures can be achieved resulting a high quality finished product. A continuous microwave belt dryer can be employed for microwave processing the one or more porous structures.

The method for drying and/or calcination the porous structures may include loading one or more porous structures onto a conveyor, conveying the porous structures continuously through a waveguide microwave heating space, subjecting the porous structures to a uniform microwave heat treatment in the heating space by propagating microwave energy through the porous structures in order to remove moisture, solvent and/or organic material from the porous structures. In some examples, the applied microwave energy is adjusted by controlling the conveyor speed and microwave power profile. Optionally, the temperature of the porous structures in the heating space is below 300° C. According to still another embodiment, a first drying step may be carried out at a temperature of between 30 and 300° C., followed by a second calcination step at a temperature of between 200 and 600° C.

The drying and/or calcination phenomena under microwave environment depends on effects of i.a. the irradiation time and microwave power level on overall drying and/or calcination kinetics and mechanical properties. Advantageously, using a microwave drying and/or calcination process induced by at least one microwave applicator 13 a number of important advantages are achieved with respect to conventional drying and/or calcination methods for drying and/or calcination porous structures obtained by means of an extrusion based additive manufacturing method. For instance, shorter processing times can be obtained. Additionally or alternatively, the volumetric dissipation of energy throughout a product can be improved. Additionally or alternatively, a high energy efficiency drying and/or calcination process can be obtained. Furthermore, also the resulting product quality can be improved. The dried one or more porous structures may have less damages (e.g. cracks) and/or product deformations as a result of the drying and/or calcination process.

In some embodiments, the microwave energy can be propagated through the porous structure for reducing its moisture, solvent and/or organic material content, wherein process parameters of the microwave drying and/or calcination are controlled in order to maintain the temperature of the porous structures in the heating chamber below about 600 degrees Celsius.

Figure 7:
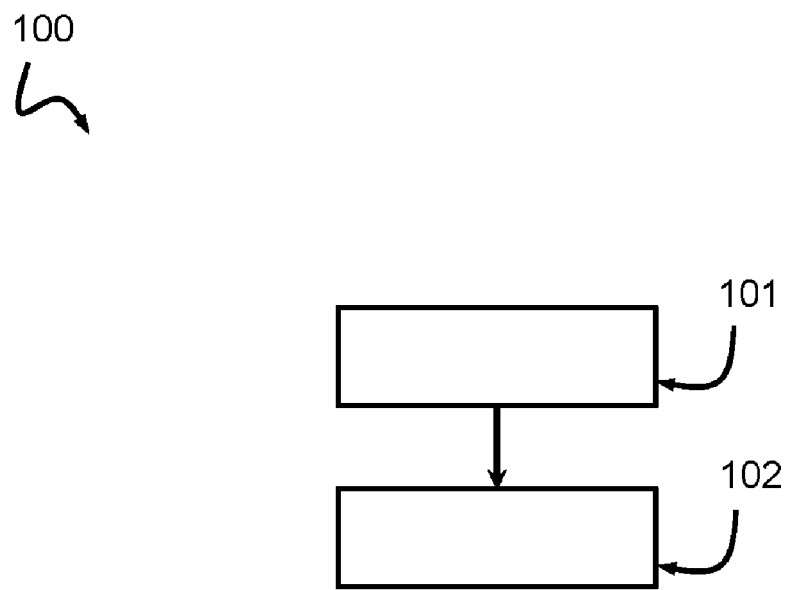
FIG. 7 shows a schematic diagram of a method.

FIG. 7 shows a schematic diagram of a method 100 for a method of manufacturing three-dimensional porous structures. In a first step 101, filaments are deposited in a predetermined interconnected arrangement in a plurality of stacked layers for forming a porous structure with interconnected pores. In a second step 102, the porous structure is subjected to a heat treatment in a heat chamber in order to reduce a moisture, solvent and/or organic material content of the porous structure by irradiating microwave energy through said porous structure. Optionally, the applied microwave energy is selected based on the arrangement of the interconnected filaments of the porous structure.

The invention provides a new process for drying and/or calcination or dehydrating printed porous structures so that an improved (e.g. stronger) dried porous structure can be achieved. The involves a unique microwave dehydration or drying and/or calcination process designed for dehydrating porous structures, wherein the specific filament arrangement of the porous structure determines the microwave energy to be applied.

In some embodiments, the microwave energy is applied intermittently for drying and/or calcination the one or more porous structure. This may improve the product quality. The process efficiency may also be improved. For instance, pulsed microwaves may be used reducing the heat loss and the actual time in which the porous structures were exposed to microwave energy. A pulsing period of the pulsed microwaves may affect the drying and/or calcination rate and product quality. For example, a ratio between the number of on-cycles and number of off-cycles within a predefined time interval for intermittent microwave operation can be chosen based on the characteristics of the one or more porous structures. In this way, a target moisture, solvent and/or organic material content range can be achieved with an improved drying and/or calcination process.

In some embodiments, an input electrical power to the microwave applicator is cycle controlled or phase controlled.

The microwave energy can be selected to reduce the moisture, solvent and/or organic material content of the porous structures sufficiently so that a reduced moisture, solvent and/or organic material content of the dried porous structures is within a target moisture, solvent and/or organic material content range.

In some embodiments, the porous structure is dried under a pressure in a range of 1 to 101325 Pa, and a temperature in a range of 30 to 300 degrees Celsius, for a time period of 1 to 120 minutes at a power of 10 to 500 kW/kg.

Figure 8:
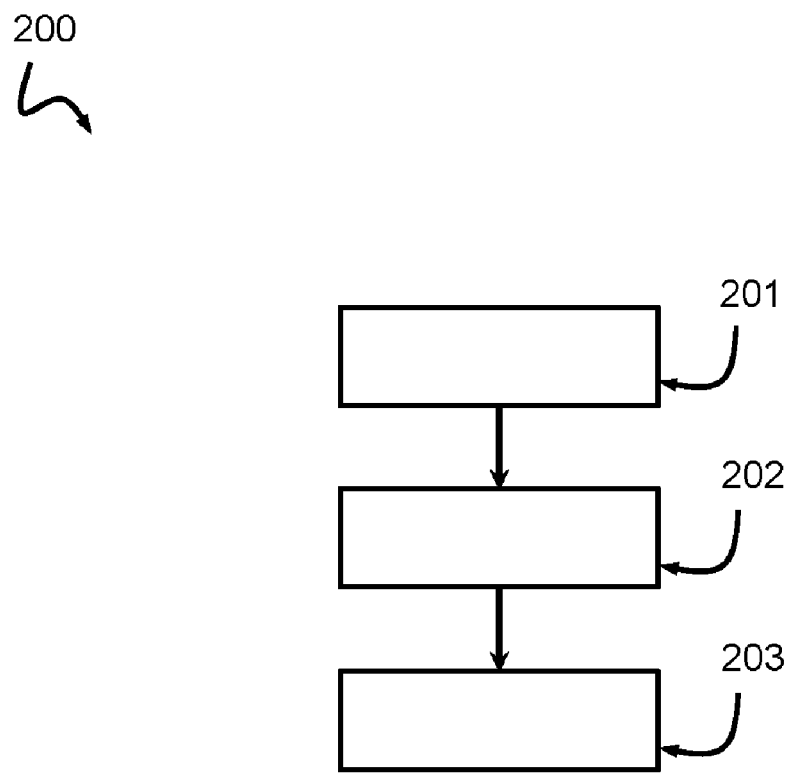
FIG. 8 shows a schematic diagram of a method.

FIG. 8 shows a schematic diagram of a method 200 for a method of manufacturing three-dimensional porous structures. In a first step 201, filaments are deposited in a predetermined interconnected arrangement in a plurality of stacked layers for forming a porous structure with interconnected pores. In step 202, an applied microwave energy is selected based on the arrangement of the interconnected filaments of the porous structure. In step 203, the porous structure is subjected to a heat treatment in a heat chamber in order to reduce a moisture, solvent and/or organic material content of the porous structure by irradiating the microwave energy through said porous structure.

The microwave drying and/or calcination enables a faster, reproducible and more homogeneous heating (i.e. high product quality). Furthermore, as a result of the porosity, the microwaves can penetrate further into the porous structure. The arrangement of the filaments which impacts the porosity is taken into account for determining or selecting the microwave energy to be applied on the porous structure during the heat treatment.

Microwave energy can accelerate the hydration of extrusion printed 3D porous structures, resulting in rapid strength development of the porous structure in an early period. Moreover, the microwave drying and/or calcination is immediately ready for operation and control without delay. Additionally, there may be no heat storage losses and specific energy consumption can be low.

In some embodiments, the microwave drying and/or calcination is performed in vacuum. For example, the pressure in the microwave chamber can be kept in a range of 10000 Pa (100 mbar) to 90000 Pa (900 mbar).

In some examples, the microwave power (cf. power density) applied is in the range of 10 to 100 kW/kg of porous structures.

In some examples, the microwave drying and/or calcination is performed without subjecting the porous structure to a temperature greater than 800 degrees Celsius, preferably not higher than 300 degrees Celsius, more preferably not higher than 100 degrees Celsius.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention is further illustrated in the examples below.

Example 1-3

A paste composition was prepared which contained 60 wt. % of water, the remaining 40 wt. % being made up of zeolite and binder in a ratio of 65 wt. % zeolite/35 wt. % binder. As zeolite use was made of ZSM-5 powder with a Si/Al ratio of 25 provided by Süd-Chemie (particle size distribution 0.5-

22 micron, $d_{50}$ 8 micron). The zeolite powder was used as received. Bentonite (VWR) was used as a binder. Before use, bentonite was milled with water.

The binders were mixed with water, thereby forming a suspension. Zeolite was added to the suspension and mixed using a planetary centrifugal mixer for 2 minutes at 1900 rpm. The water content of 60 wt. % ensured good flow behavior of the paste. As the slurry temperature increased due to vigorously mixing, the viscous paste was cooled to room temperature before extrusion, to prevent water evaporation and changes in paste composition.

Several porous structures were printed, each of which had a weight of 2 g. The thus printed porous structures were dried using microwave energy, using the conditions described in table 1 below. The properties of the dried porous structures are summarized in table 2 below.

The structures were produced using a home-build machine, as described in literature. (J. Luyten, S. Mullens, I. Thijs KONA Powder and Particle Journal, 28 (2010), p. 131).

TABLE 1

| Example | Condition | Duration (h) | Applied energy (KWh/kg) |
|---|---|---|---|
| 1 | Microwave 100 W | 2 | 100 |
| 2 | Microwave 200 W | 1 | 100 |
| 3 | Microwave 400 W | 0.5 | 100 |

TABLE 2

| Example | Structure shrinkage (%) | Filament Porosity (%) | Filament diameter (μm) (STDV) | Integrity |
|---|---|---|---|---|
| 1 | 16% | 62 | 718 (52) | No cracks |
| 2 | 9% | 66 | 906 (120) | No cracks |
| 3 | 8% | 66 | 889 (93) | Cracks |

STDV = Standard Deviation

From the results summarized in table 1 and 2 it can be concluded that a certain amount of energy is needed to achieve drying of the filaments and the porous structure, and that the porosity of the structure increases with increasing microwave energy applied. Most probably this must be attributed to water removal.

As long as the microwave energy remains below a certain level, crack formation may be prevented. Without wanting to be bound by this theory, the inventors assume that a more or less controlled water evaporation and escape of water vapour from the filaments may take place, as long as the microwave energy remains limited. Thereby, water evaporation and escape from the material of the filaments may take place simultaneously inside the filaments and from outer layers of the filaments.

Once the microwave energy reaches a certain level, cracks are formed during drying. The inventors assume, again without wanting to be bound by this theory, that crack formation may be caused by fast drying of and water removal from outer parts or layers of the filaments. It is assumed that the dried outer layer hinders escape of evaporated water from more internally located parts of the filaments. Water evaporation may give rise to pressure build up in the inner part of the filaments, which seeks to escape via parts of the filaments having a weaker mechanical strength, and thereby causes crack formation.

Comparative Experiments A-B

Two porous structures were printed using the paste composition of example 1-3. After having been printed on a depositing platform, the porous structures were dried in air using conventional heating at the conditions described in table 3 below. The results, in particular the material properties are summarized in table 4 below.

It is assumed that air drying of the porous structure first causes drying of the outer layers of the filaments, which hinders escape of evaporating water from more internally located parts of the filaments. Water pressure build up in the inner part of the filaments, causes crack formation as water will seek to escape the filament via parts with a weaker mechanical strength.

TABLE 3

| Comparative Experiment | Conditions | Duration (h) |
|---|---|---|
| A | Room temperature - open air | 24 |
| B | Room temperature - closed vessel | 48 |

TABLE 4

| Comparative Experiment | structure shrinkage (%) | Filament Porosity (%) | Filament diameter (STDV) (μm) | Integrity |
|---|---|---|---|---|
| A | 17% | 61 | 725 (27) | cracks |
| B | 12% | 60 | 703 (56) | Cracks |

Example 4-6

Several porous structures were printed, each of which had a weight of 5.3 g, using a paste which contained 57 wt. % of water and 43 wt. % of alumina (bhoemite (DISPERAL) from Sasol, particle size=$d_{50}$=26 μm). After having been printed on a depositing platform, the porous structures are dried using microwave energy, using the conditions described in table 5 below. The results, in particular the material properties are summarized in table 6 below.

TABLE 5

| Example | Condition | Duration (h) | Applied energy (KWh/kg) |
|---|---|---|---|
| 4 | Microwave 400 W | 0.5 | 38 |

TABLE 6

| Example | Filament diameter (μm) | Integrity |
|---|---|---|
| 4 | 742 (20) | No cracks |

As can be understood from the comparison of example 3 and 4, different materials may have a different micro-wave susceptibility and give rise to crack formation at different microwave energies.—

Comparative Experiment C

A porous structure was printed according to the procedure described in example 4-6. After having been printed on a depositing platform, the porous structures were dried in air using conventional heating at the conditions described in table 7 below. The results, in particular the material properties are summarized in table 8 below.

TABLE 7

| Comparative Experiment | Conditions | Duration (h) | Applied energy (KWh/kg) |
|---|---|---|---|
| C | Room temperature - open air | 24 | — |

TABLE 8

| Comparative Experiment | Filament diameter (μm) | Integrity |
|---|---|---|
| C | 675 (20) | cracks |

The invention claimed is:

1. A method of manufacturing three-dimensional porous structures, the method including:
providing a paste composition comprising particles of at least one inorganic material, at least one polymeric binder and at least one solvent,
depositing filaments of the paste composition in a predetermined interconnected arrangement in a plurality of consecutively stacked layers for forming a three-dimensional porous structure with interconnected pores between the filaments,
subsequently drying the deposited three-dimensional porous structure by subjecting the porous structure to a heat treatment by irradiating microwave energy through said porous structure, wherein the applied microwave energy employed during the heat treatment is tailored based on at least the relative spatial positioning and orientation of the filaments forming the three-dimensional porous structure.

2. The method according to claim 1, wherein the applied microwave energy is tailored further based on macro-porosity of the porous structure resulting from the pores between the filaments.

3. The method according to claim 1, wherein the applied microwave energy is tailored based on at least one of: a filament-to-filament distance, filament lay down pattern, a filament placement interrelation, geometrical pattern formed by the filaments, or a lay down angle of the filaments in the consecutively stacked layers.

4. The method according to claim 1, wherein the porous structure is stabilized against vibrations in the course of applying the microwave energy.

5. The method according to claim 1, wherein the heat treatment is carried out in a heat chamber in order to reduce the amount of moisture, solvent and/or organic material.

6. The method according to claim 1, wherein the applied microwave energy is tailored further based on at least one of: the affinity of the solvent for one or more of the components of the paste composition, the paste composition, the nature of the solvent, the concentration of one or more of the solvent, moisture and organic material in the three-dimensional porous structure.

7. The method according to claim 1, wherein the porous structure is one or more of a mesh, a lattice structure, a filament network, a scaffold, a filament framework, a filament patterned arrangement.

8. The method according to claim 1, wherein the applied microwave energy is controlled by adjusting at least one of: a microwave frequency, a microwave power, an irradiation duration, or a power profile of the microwave energy.

9. The method according to claim 5, wherein the power profile is configured to provide pulsed microwaves with an intermittent microwave operation including on-cycles and off-cycles within a predefined time interval.

10. The method according to claim 9, wherein consecutive microwave pulses have the same or different time length.

11. The method according to claim 9, wherein the power of the microwave energy is pulsed on 0.1 seconds up to 10 minutes and off respectively 0.1 seconds up to 5 minutes.

12. The method according to claim 1, wherein the microwave energy is applied in consecutive cycles and wherein the microwave energy applied in a first cycle is different from the microwave energy applied in a second cycle consecutive to the first cycle.

13. The method according to claim 1, wherein the heat treatment includes a plurality of microwave drying and/or calcination stages, wherein in a first stage the microwave energy has a first microwave power with a first energy density, and wherein in a successive second stage the microwave energy has a second microwave power with a second energy density, the first energy density being lower than the second energy density.

14. The method according to claim 1, wherein the porous structure is heated by means of the applied microwave energy from an initial temperature to an elevated temperature, wherein the microwave energy is controlled in order to keep the elevated temperature below specific morphology or phase change temperatures of the porous material.

15. The method according to claim 1, wherein a temperature of the porous structure is monitored using a temperature sensor, wherein a control system with a temperature feedback is provided which is configured to adjust the microwave energy dynamically according to the determined temperature of the porous structure.

16. The method according to claim 1, wherein the porous structure is dried with microwave energy having a microwave power density in a range of 0.01 to 10000 kWh/kg.

17. The method according to claim 1, wherein the heat treatment by irradiating microwave energy is performed in vacuum with a pressure in a range of 1 Pa to 101325 Pa.

18. The method according to claim 1, wherein the temperature during heat treatment is elevated to a temperature in a range between 25° C. to 800° C.

19. The method according to claim 1, wherein the three-dimensional porous structure is subjected to microwave irradiation with a uniform energy density.

20. The method according to claim 1, wherein the microwave energy applied to the porous structure is variable.

21. The method according to claim 1, wherein the three-dimensional porous structure is subjected to at least one supplementary drying and/or calcination and/or sintering treatment.

22. The method according to claim 21, wherein the at least one supplementary drying and/or calcination and/or sintering treatment is carried out in advance of the heat treatment by irradiating microwave energy, after the heat treatment by irradiating microwave energy, and/or between consecutive heat treatments by irradiating microwave energy.

23. The method according to claim 1, wherein several less frangible regions are formed in the arrangement of filaments and wherein one or more preselected frangible regions are formed in the arrangement of filaments, wherein the one or more frangible regions form structurally weakened zones of the porous structure such that the porous structure breaks along said one or more frangible regions under influence of the applied microwave energy.

24. The method according to claim 1, wherein the heat treatment involving irradiating microwave energy is followed by a heating step to cause sintering of the three-dimensional porous structures.

* * * * *